(12) United States Patent
Reilly et al.

(10) Patent No.: US 7,123,145 B2
(45) Date of Patent: Oct. 17, 2006

(54) METHOD AND APPARATUS FOR ANALYSING A SIGNAL FROM A MOVEMENT DETECTOR FOR DETERMINING IF MOVEMENT HAS BEEN DETECTED IN AN AREA UNDER SURVEILLANCE AND AN ANTI-THEFT SYSTEM

(75) Inventors: Peter Joseph Reilly, Galway (IE); Derek Anthony Savage, Galway (IE); Vincent Duffy, Galway (IE)

(73) Assignee: Hi-Key Limited, County Galway (IE)

( * ) Notice: Subject to any disclaimer, the term of this patent is extended or adjusted under 35 U.S.C. 154(b) by 28 days.

(21) Appl. No.: 10/492,177

(22) PCT Filed: Oct. 14, 2002

(86) PCT No.: PCT/IE02/00143

§ 371 (c)(1),
(2), (4) Date: Apr. 9, 2004

(87) PCT Pub. No.: WO03/046605

PCT Pub. Date: Jun. 5, 2003

(65) Prior Publication Data

US 2004/0246124 A1     Dec. 9, 2004

(30) Foreign Application Priority Data

Oct. 12, 2001   (IE) .............................. S20010901

(51) Int. Cl.
*G08B 13/18* (2006.01)

(52) U.S. Cl. .................. 340/552; 340/541; 340/554; 340/565; 342/27; 342/28

(58) Field of Classification Search ................ 340/552, 340/541, 557, 573.1, 573.4, 573.6, 554, 545.3, 340/446, 447, 565; 342/27, 28; 348/699
See application file for complete search history.

(56) References Cited

U.S. PATENT DOCUMENTS

| 3,876,951 | A | | 4/1975 | McLean |
| 5,521,600 | A | | 5/1996 | McEwan |
| 5,790,032 | A | | 8/1998 | Schmidt |
| 5,874,996 | A | * | 2/1999 | Shimokoriyama et al. ............... 375/240.02 |
| 5,966,090 | A | | 10/1999 | McEwan |
| 6,753,780 | B1 | * | 6/2004 | Li ........................ 340/573.1 |

FOREIGN PATENT DOCUMENTS

| GB | 2 322 029 A | 8/1998 |
| WO | WO 97/23786 A1 | 7/1997 |

* cited by examiner

*Primary Examiner*—Davetta W. Goins
(74) *Attorney, Agent, or Firm*—Sughrue Mion, PLLC

(57) ABSTRACT

An anti-theft system (1) for a motor vehicle detects movement in the motor vehicle, while at the same time avoiding false alarms. A movement detector (2) comprises a transmitter circuit (3) which transmits a microwave signal in bursts of around six nanoseconds duration and a receiver circuit (4) which receives the transmitted signals and reflected signals. The transmitted and reflected signals are mixed, and envelope detected in an envelope detector (22). The signals from the envelope detector (22) are passed through three filters, namely, a low pass filter (25) which passes low frequency signals in the range of 1 Hz to 40 Hz, a high pass filter (26) which passes high frequency signals of greater than 100 Hz and a band pass filter 15 (27) which passes intermediate frequency signals in the range of 40 Hz to 80 Hz. The signals from the filters (25,26,27) are analysed in a microprocessor (28). Slow movements in the vehicle are determined from the signals from the low pass filter (25), while fast movements in the vehicle are determined from the signal from the band pass filter (27). Interference signals, such as mobile phone signals are determined and identified from the signal from the high pass filter (26) and the low pass filter (25). In the event of interference being caused by a mobile phone, a low frequency energy alarm threshold value (40) of the energy in the signal from the low pass filter (25), at which an alarm condition would be determined as having been detected, is increased to an intermediate threshold value (40''') which is above the 25 energy value of the low frequency component of the mobile phone interference, thereby preventing a false alarm due to the presence of mobile phone interference. However, the intermediate value (40''') of the low frequency energy alarm threshold is such as to permit detection for slow movements in the vehicle during the presence of the mobile phone interference.

36 Claims, 5 Drawing Sheets

Figure 1:
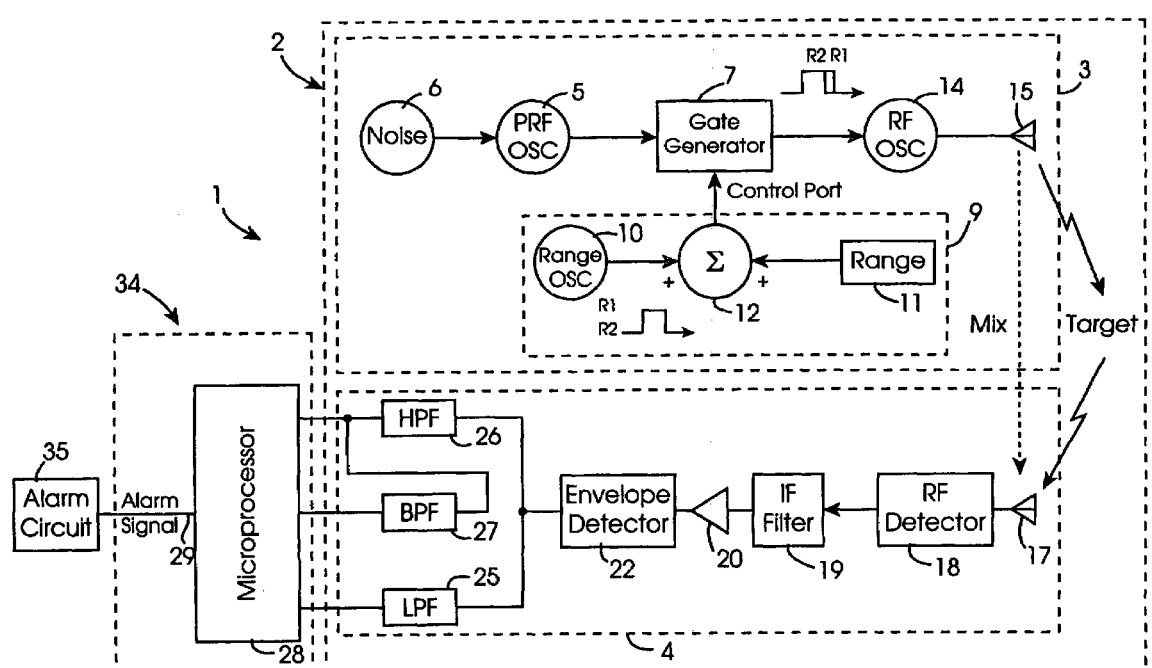

METHOD AND APPARATUS FOR ANALYSING A SIGNAL FROM A MOVEMENT DETECTOR FOR DETERMINING IF MOVEMENT HAS BEEN DETECTED IN AN AREA UNDER SURVEILLANCE AND AN ANTI-THEFT SYSTEM

The present invention relates to a method and apparatus for analysing a frequency signal from a movement detector for determining if movement has been detected in an area under surveillance by the movement detector, and in particular, the invention relates to such a method and apparatus for analysing the frequency signal for distinguishing a signal resulting from movement from a signal resulting from a spurious source. The invention also relates to an anti-theft system for detecting movement in an area under surveillance, for example, for detecting movement in a motor vehicle.

Movement detectors for detecting movement in an area under surveillance are well known. Such movement detectors are commonly used in anti-theft systems for motor vehicles. In general, such movement detectors operate on the Doppler principle, and comprise a radio frequency transmitter, which transmits a radio frequency signal which is detected by an adjacent receiver, which also receives a reflection of the transmitted signal. The received transmitted signal and the received reflected transmitted signal are mixed to produce a difference frequency signal which is equal to the Doppler shift produced by a moving target from which the transmitted signal is reflected. In order to precisely define the range of such movement detectors, the radio frequency signal is transmitted in short bursts, and the length of the burst determines the surveillance range. Such a movement detector is disclosed in U.S. Pat. No. 5,966,090 of Thomas E. McEwan. While movement detectors of the type of the McEwan detector are suitable for detecting movement in a motor vehicle, for example, movement caused by an attempt to gain entry to or to steal the vehicle, unfortunately, such detectors are, in general, unsuitable for distinguishing between a movement resulting from an attempt to enter the vehicle or to steal the vehicle and external interference, such as, for example, the type caused by a mobile phone and other such interference. Thus, such movement detectors are prone to giving false alarms.

Where such movement detectors are capable of determining that a signal received is not the result of movement, such detectors classify such signals as being the result of interference, and while the interference remains the detector is inhibited from outputting an alarm signal, in order to avoid a potential false alarm. This, thus, causes serious problems in that a determined thief could, for example, by generating a mobile phone signal in or in proximity to a motor vehicle, inhibit a movement detector of such a vehicle from outputting an alarm signal, and could thus gain entry to the vehicle without the alarm being activated. A further problem associated with such movement detectors is that it has been found that where coins or other light metal objects are placed together in a tray in a motor vehicle, for example, in an ashtray or the like, and if the vehicle is subjected to a jolt the coins commence to vibrate. The vibrating coins induce a high energy interference signal which is received by the detector. This is thus another source of false alarms, and to avoid such a false alarm again in the presence of such a signal, the movement detector is inhibited from outputting an alarm signal. Vibration of such coins or other light metal objects within a vehicle can be caused by a person banging on the vehicle, or indeed, by hailstones or particularly heavy rain falling on the vehicle. Thus, a thief by banging on the vehicle could induce vibration in coins in a vehicle sufficient to disable the movement detector, thus permitting the thief to gain entry to the vehicle without the alarm being activated. This type of interference caused by vibrating coins in a vehicle is commonly referred to as passive intermodulation interference.

There is therefore a need for a method and apparatus for analysing signals from a movement detector which permits a signal resulting from movement to be distinguished from a signal resulting from a spurious signal, for minimising periods during which an anti-theft system is disabled in the presence of a spurious signal, while at the same time minimising false alarms. There is also a need for an anti-theft system for detecting movement to be distinguished from signals from a spurious source.

The present invention is directed towards providing such a method and apparatus for analysing a frequency signal from a movement detector for distinguishing a signal resulting from movement from a signal resulting from a spurious signal, and the invention is also directed to an anti-theft system.

According to the invention there is provided a method for analysing a frequency signal from a movement detector for determining if movement has been detected in an area under surveillance by the movement detector, and for distinguishing a signal resulting from movement from a signal resulting from a spurious source, wherein the method comprises the steps of:

determining a value of a characteristic of a low frequency component of the frequency signal, comparing the determined value of the characteristic of the low frequency component with a set threshold value of a low frequency alarm threshold for determining if the determined value of the characteristic of the low frequency component is indicative of movement having been detected, determining a value of a characteristic of a high frequency component of the frequency signal to ascertain if the value of the characteristic of the high frequency component is indicative of a signal from a known spurious source having been detected, and setting the low frequency alarm threshold at an intermediate threshold value, if the determined value of the characteristic of the high frequency component is indicative of a signal from a known spurious source, the intermediate threshold value being greater than the value of a corresponding characteristic of a low frequency component of the frequency signal resulting from the signal from the known spurious source for preventing a false alarm.

In one embodiment of the invention the method further comprises outputting an alarm signal in response to the determined value of the characteristic of the low frequency component of the frequency signal exceeding the low frequency alarm threshold when the low frequency alarm threshold is set at the intermediate threshold value.

In another embodiment of the invention an alarm signal is outputted in response to the determined value of the characteristic of the low frequency component of the frequency signal exceeding the low frequency alarm threshold when the low frequency alarm threshold is set at a first threshold value, and when the determined characteristic of the high frequency component of the frequency signal does not exceed a high frequency threshold, the first threshold value of the low frequency alarm threshold being less than the intermediate threshold value thereof.

In a further embodiment of the invention the determined value of the characteristic of the high frequency component of the frequency signal is compared with the high frequency threshold for determining if the value of the characteristic of the high frequency component is indicative of a signal from a spurious source, and if the determined value of the characteristic of the high frequency component exceeds the high frequency threshold, the low frequency alarm threshold is set at a maximum threshold value.

Preferably, the maximum threshold value of the low frequency alarm threshold is greater than the intermediate threshold value thereof for preventing false alarms.

Advantageously, the maximum threshold value of the low frequency alarm threshold is greater than the greatest value of the characteristic of the low frequency component of frequency signals likely to be encountered.

Preferably, the first threshold value of the low frequency alarm threshold is set at a value above the background noise level in the low frequency component of the frequency signal in the absence of a spurious signal. Advantageously, the first threshold value of the low frequency alarm threshold is set in response to the value of the background noise in the low frequency component of the frequency signal.

In one embodiment of the invention the intermediate threshold value of the low frequency alarm threshold is set in response to the determined value of the characteristic of the high frequency component of the frequency signal resulting from the signal from the known spurious source.

Preferably, the determined value of the characteristic of the high frequency component of the frequency signal is compared with the corresponding determined characteristic of the low frequency component of the frequency signal for determining if the frequency signal has resulted from a signal from a known spurious source.

Advantageously, the ratio of the determined value of the characteristic of the high frequency component of the frequency signal to the determined value of the characteristic of the low frequency component of the frequency signal is compared with a predetermined ratio value, for determining if the frequency signal resulted from a known spurious source.

In one embodiment of the invention the frequency range of the low frequency component of the frequency signal is selected for determining slow movements within the area under surveillance.

In another embodiment of the invention the method further comprises the step of determining the value of a characteristic of an intermediate frequency component of the frequency signal, and comparing the determined value of the characteristic of the intermediate frequency component with an intermediate frequency threshold for determining if the determined value of the characteristic of the intermediate frequency component of the frequency signal is indicative of a fast movement having been detected.

In another embodiment of the invention the intermediate frequency range of the frequency signal is in the range of 40 Hz to 100 Hz. Preferably, the intermediate frequency range of the frequency signal is in the range of 40 Hz to 75 Hz.

In another embodiment of the invention the low frequency range of the frequency signal is in the range up to 100 Hz. Preferably, the low frequency range of the frequency signal is in the range up to 75 Hz. Advantageously, the low frequency range of the frequency signal is in the range up to 40 Hz.

In a further embodiment of the invention the high frequency range of the frequency signal exceeds 100 Hz. Preferably, the high frequency range of the frequency signal is in the range of 100 Hz to 1,000 Hz.

In one embodiment of the invention the set threshold value of the low frequency alarm threshold is reduced when a signal from a spurious source is determined as having ceased. Preferably, the set threshold value of the low frequency alarm threshold is progressively reduced when a signal from a spurious source is determined as having ceased. Advantageously, the set-threshold value of the low frequency alarm threshold is progressively reduced in decremental steps when a signal from a spurious source is determined as having ceased. Ideally, the set threshold value of the low frequency alarm threshold is reduced to the first threshold value when the signal from a spurious source is determined as having ceased.

In one embodiment of the invention the characteristic, the value of which is determined in respect of the low frequency component of the frequency signal is a characteristic indicative of the energy of the low frequency component of the frequency signal, and the low frequency alarm threshold is an energy threshold.

In another embodiment of the invention the characteristic, the value of which is determined in respect of the low frequency component of the frequency signal is a characteristic indicative of the amplitude of the low frequency component of the frequency signal, and the low frequency alarm threshold is an amplitude threshold.

Preferably, the value of the characteristic indicative of the energy and the value of the characteristic indicative of the amplitude of the low frequency component of the frequency signal are both determined.

In one embodiment of the invention the characteristic, the value of which is determined in respect of the high frequency component of the frequency signal is a characteristic indicative of the energy of the high frequency component of the frequency signal, and the high frequency threshold is an energy threshold.

In another embodiment of the invention the characteristic, the value of which is determined in respect of the intermediate frequency component of the frequency signal is a characteristic indicative of the energy of the intermediate frequency component of the frequency signal, and the intermediate frequency threshold is an energy threshold.

In a further embodiment of the invention the characteristic, the value of which is determined in respect of the intermediate frequency component of the frequency signal is a characteristic indicative of the amplitude of the intermediate frequency component of the frequency signal, and the intermediate frequency threshold is an amplitude threshold.

Preferably, the value of the characteristic indicative of the energy and the value of the characteristic indicative of the amplitude of the intermediate frequency component of the frequency signal are both determined.

In one embodiment of the invention the value of the characteristic indicative of energy of each frequency component of the frequency signal is determined by integrating the corresponding frequency component of the frequency signal.

In another embodiment of the invention the low, high and intermediate frequency components of the frequency signal are sampled at predetermined intervals during a predetermined cycle period.

In a further embodiment of the invention the maximum value of the characteristic determined during each cycle period for each frequency component is recorded, and the alarm signal is outputted in response to the recorded maximum values.

In a still further embodiment of the invention the number of times the determined value of the characteristic indicative of the amplitude of the low frequency component of the frequency signal exceeds the set amplitude threshold value of the low frequency alarm threshold is recorded during each cycle period, and the alarm signal is outputted in response to the recorded number of times the determined value of the characteristic indicative of the amplitude exceeds the set amplitude threshold value of the low frequency alarm threshold.

In one embodiment of the invention the number of times the determined value of the characteristic indicative of the amplitude of the intermediate frequency component of the frequency signal exceeds the set amplitude threshold value of the intermediate frequency threshold is recorded during each cycle period, and the alarm signal is outputted in response to the recorded number of times the determined value of the characteristic indicative of the amplitude exceeds the set amplitude threshold value of the intermediate frequency threshold.

In another embodiment of the invention the frequency signal is passed through a low pass filter for providing the low frequency component of the frequency signal. Preferably, the frequency signal is passed through a high pass filter for providing the high frequency component of the frequency signal. Advantageously, the frequency signal is passed through a bandpass filter for providing the intermediate frequency component of the frequency signal.

In one embodiment of the invention the frequency signal is derived from a microwave movement detector.

In another embodiment of the invention the frequency signal is derived from a differential microwave signal.

In a further embodiment of the invention the frequency signal is derived from an envelope detector.

In a still further embodiment of the invention the frequency signal is derived from a receiver which receives a combination of a transmitted signal and a reflection of the transmitted signal.

Preferably, the transmitted signal is transmitted in bursts.

Advantageously, the received transmitted signal and the reflection of the transmitted signal are mixed to produce a difference frequency corresponding to the Doppler shift produced by a moving target.

In one embodiment of the invention the frequency signals are voltage signals.

Additionally, the invention provides apparatus for analysing a frequency signal from a movement detector for determining if movement has been detected in an area under surveillance by the movement detector, and for distinguishing a signal resulting from movement from a signal resulting from a spurious source, wherein the apparatus comprises:

a means for determining a value of a characteristic of a low frequency component of the frequency signal, a first comparing means for comparing the determined value of the characteristic of the low frequency component with a set threshold value of a low frequency alarm threshold for determining if the determined value of the characteristic of the low frequency component is indicative of movement having been detected, a means for determining a value of a characteristic of a high frequency component of the frequency signal to ascertain if the value of the characteristic of the high frequency component is indicative of a signal from a known spurious source having been detected, and a means for setting the low frequency alarm threshold at an intermediate threshold value, if the determined value of the characteristic of the high frequency component is indicative of a signal from a known spurious source, the intermediate threshold value being greater than the value of a corresponding characteristic of a low frequency component of the frequency signal resulting from the signal from the known spurious source for preventing a false alarm.

In one embodiment of the invention a means is provided for outputting an alarm signal, the means for outputting the alarm signal being responsive to the determined value of the characteristic of the low frequency component of the frequency signal exceeding the low frequency alarm threshold when the low frequency alarm threshold is set at the intermediate threshold value.

In another embodiment of the invention the means for outputting the alarm signal is responsive to the determined value of the characteristic of the low frequency component of the frequency signal exceeding the low frequency alarm threshold when the low frequency alarm threshold is set at a first threshold value, and when the determined characteristic of the high frequency component of the frequency signal does not exceed a high frequency threshold, the first threshold value of the low frequency alarm threshold being less than the intermediate threshold value thereof.

In a further embodiment of the invention a second comparing means is provided for comparing the determined value of the characteristic of the high frequency component of the frequency signal with the high frequency threshold for determining if the value of the characteristic of the high frequency component is indicative of a signal from a spurious source, and if the determined value of the characteristic of the high frequency component exceeds the high frequency threshold, the means for setting the threshold value of the low frequency alarm threshold sets the low frequency alarm threshold at a maximum threshold value. Preferably, the maximum threshold value of the low frequency alarm threshold is greater than the intermediate threshold value thereof for preventing false alarms. Advantageously, the maximum threshold value of the low frequency alarm threshold is greater than the greatest value of the characteristic of the low frequency component of frequency signals likely to be encountered.

In one embodiment of the invention the means for setting the threshold value of the low frequency alarm threshold sets the low frequency alarm threshold at the first threshold value, which is a value above the background noise level in the low frequency component of the frequency signal, in the absence of spurious signals.

Preferably, the means for setting the low frequency alarm threshold is responsive to the value of the background noise in the low frequency component of the frequency signal for setting the low frequency alarm threshold at the first threshold value.

Advantageously, the means for setting the low frequency alarm threshold sets the low frequency alarm threshold at the intermediate threshold value in response to the determined value of the characteristic of the high frequency component of the frequency signal resulting from the signal from the known spurious source.

In another embodiment of the invention a third comparing means is provided for comparing the determined value of the characteristic of the high frequency component of the frequency signal with the corresponding determined characteristic of the low frequency component of the frequency signal for determining if the frequency signal has resulted from a signal from a known spurious source.

Preferably, the third comparing means compares the ratio of the determined value of the characteristic of the high frequency component of the frequency signal to the determined value of the characteristic of the low frequency component of the frequency signal with a predetermined ratio value for determining if the frequency signal has resulted from a signal from a known spurious source.

Preferably, the frequency range of the low frequency component of the frequency signal is selected for determining slow movements within the area under surveillance.

In one embodiment of the invention a means for determining the value of a characteristic of an intermediate frequency component of the frequency signal is provided, and a fourth comparing means is provided for comparing the determined value of the characteristic of the intermediate frequency component with an intermediate frequency threshold for determining if the determined value of the characteristic of the intermediate frequency component of the frequency signal is indicative of fast movement having been detected.

In another embodiment of the invention the intermediate frequency range of the frequency signal is in the range of 40 Hz to 100 Hz. Preferably, the intermediate frequency range of the frequency signal is in the range of 40 Hz to 75 Hz.

In another embodiment of the invention the low frequency range of the frequency signal is in the range up to 100 Hz. Preferably, the low frequency range of the frequency signal is in the range up to 75 Hz. Advantageously, the low frequency range of the frequency signal is in the range up to 40 Hz.

In another embodiment of the invention the high frequency range of the frequency signal exceeds 100 Hz. Preferably, the high frequency range of the frequency signal is in the range of 100 Hz to 1,000 Hz.

In one embodiment of the invention the means for setting the threshold value of the low frequency alarm threshold reduces the low frequency alarm threshold in response to a signal from a spurious source having ceased. Preferably, the means for setting the threshold value of the low frequency alarm threshold progressively reduces the low frequency alarm threshold in response to a spurious source having ceased. Advantageously, the means for setting the threshold value of the low frequency alarm threshold progressively reduces the low frequency alarm threshold in decremental steps in response to a spurious source having ceased. Ideally, the means for setting the threshold value of the low frequency alarm threshold reduces the low frequency alarm threshold to the first threshold value in response to a spurious source having ceased.

In another embodiment of the invention the means for determining the value of the characteristic which is determined in respect of the low frequency component of the frequency signal determines the value of a characteristic indicative of the energy of the low frequency component of the frequency signal, and the low frequency alarm threshold is an energy threshold.

In another embodiment of the invention the means for determining the value of the characteristic which is determined in respect of the low frequency component of the frequency signal determines the value of a characteristic indicative of the amplitude of the low frequency component of the frequency signal, and the low frequency alarm threshold is an amplitude threshold.

Preferably, the means for determining the value of the characteristic of the low frequency component of the frequency signal determines the values of the characteristic indicative of the energy and the characteristic indicative of the amplitude of the low frequency component of the frequency signal.

In another embodiment of the invention the means for determining the value of the characteristic which is determined in respect of the high frequency component of the frequency signal determines the value of a characteristic indicative of the energy of the high frequency component of the frequency signal, and the high frequency threshold is an energy threshold.

In one embodiment of the invention the means for determining the value of the characteristic which is determined in respect of the intermediate frequency component of the frequency signal determines the value of a characteristic indicative of the energy of the intermediate frequency component of the frequency signal, and the intermediate frequency threshold is an energy threshold.

In another embodiment of the invention the means for determining the value of the characteristic which is determined in respect of the intermediate frequency component of the frequency signal determines a characteristic indicative of the amplitude of the intermediate frequency component of the frequency signal, and the intermediate frequency threshold is an amplitude threshold.

Preferably, the means for determining the value of the characteristic of the intermediate frequency component of the frequency signal determines the values of the characteristic indicative of the energy and the characteristic indicative of the amplitude of the intermediate frequency component of the frequency signal.

In one embodiment of the invention the characteristic indicative of energy of each frequency component of the frequency signal is determined by an integrating means which integrates the corresponding frequency component of the frequency signal.

In another embodiment of the invention a sampling means is provided for sampling the low, high and intermediate frequency components of the frequency signal at predetermined intervals during a predetermined cycle period.

In a further embodiment of the invention a storing means is provided for storing the maximum value of the characteristic determined during each cycle period for each frequency component, and the means for outputting the alarm signal is responsive to the stored maximum values. Preferably, the storing means stores the number of times the determined value of the characteristic indicative of the amplitude of the low frequency component of the frequency signal exceeds the set threshold value of the low frequency alarm threshold during each cycle period, and the means for outputting the alarm signal is responsive to the stored number of times the determined value of the characteristic indicative of the amplitude exceeds the set threshold value of the low frequency alarm threshold.

Advantageously, the storing means stores the number of times the determined value of the characteristic indicative of the amplitude of the intermediate frequency component of the frequency signal exceeds the intermediate frequency threshold during each cycle period, and the means for outputting the alarm signal is responsive to the recorded number of times the determined value of the characteristic indicative of the amplitude exceeds the intermediate frequency threshold.

In one embodiment of the invention a low pass filter is provided for filtering the frequency signal for producing the low frequency component of the frequency signal. Preferably, a high pass filter is provided for filtering the frequency signal for producing the high frequency component of the frequency signal. Advantageously, a bandpass filter is provided for filtering the frequency signal for producing the intermediate frequency component of the frequency signal.

In one embodiment of the invention a microwave movement detector is provided for providing the frequency signal.

In another embodiment of the invention the frequency signal is derived from a differential microwave signal.

Preferably, the microwave movement detector comprises an envelope detector for outputting the frequency signal.

Advantageously, the microwave detector comprises a transmitter circuit for transmitting a radio frequency signal and a receiver circuit for receiving a combination of the transmitted signal and a reflection of the transmitted signal.

Preferably, the transmitter circuit transmits the radio frequency signal in bursts.

Advantageously, the receiver circuit mixes the received transmitted signal and the reflection of the transmitted signal to produce a difference frequency corresponding to the Doppler shift produced by a moving target.

In one embodiment of the invention the frequency signals are voltage signals.

The invention also provides an anti-theft system comprising a transmitter circuit for transmitting a sequence of bursts of electromagnetic energy to produce a sensor field, the transmitted bursts having burst widths which vary according to a pattern, a receiver circuit for receiving a combination of the transmitted bursts and reflections of the transmitted bursts and for producing a combined output frequency signal, and apparatus according to the invention for receiving and analysing the frequency signal.

The advantages of the invention are many. By virtue of the fact that the method and apparatus according to the invention can identify a signal from a known spurious source, and furthermore, by virtue of the fact that on identifying a signal from the known spurious source the low frequency alarm threshold is set at an intermediate threshold value, which is greater than the value of the corresponding characteristic of the low frequency component of the frequency signal resulting from the signal from the known spurious source, false alarms are avoided, and furthermore, the anti-theft system can still detect movement in the presence of the signal from the known spurious source, by determining the value of the characteristic of the low frequency component of the frequency signal. Thus, if the determined value of the characteristic of the low frequency component of the frequency signal exceeds the intermediate threshold value, a valid alarm signal is outputted. This is a particularly important advantage in that it permits the anti-theft system to continue to operate in the presence of the signal from the known spurious source, and detect movement in the presence of the known spurious source signal. Where the signal from the known spurious source is a mobile phone signal, the anti-theft system can still operate in the presence of a mobile phone signal. This is a particularly important advantage where the anti-theft system is installed in a motor vehicle for detecting movement in the motor vehicle.

Figure 2:
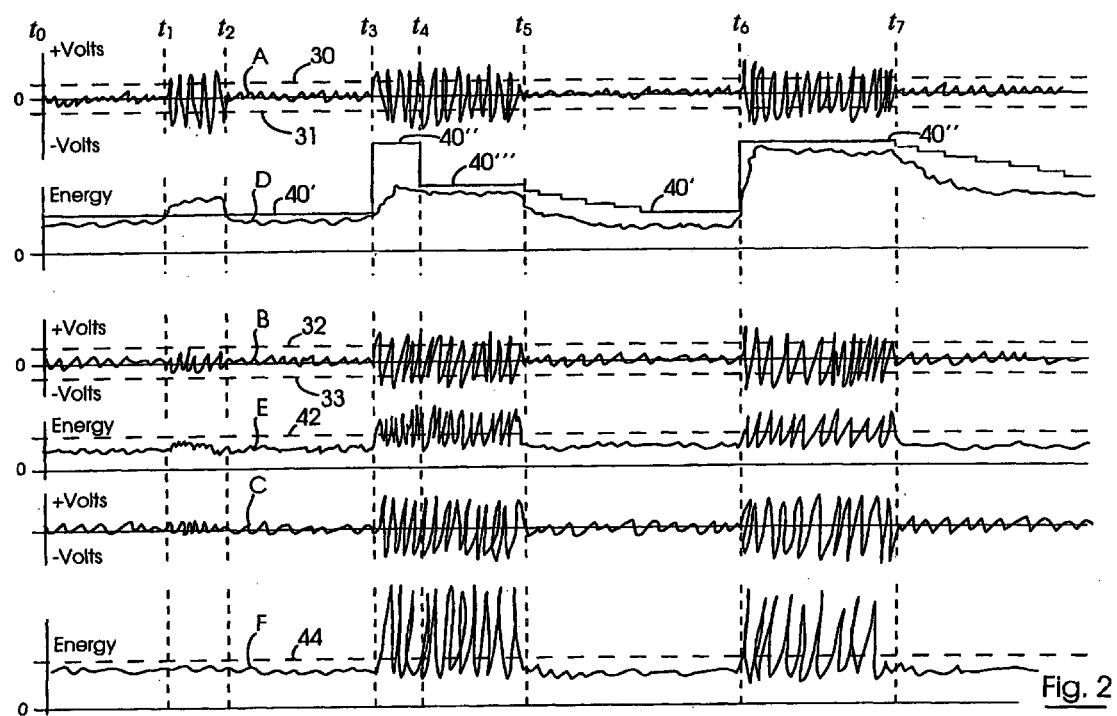
Figure 3:
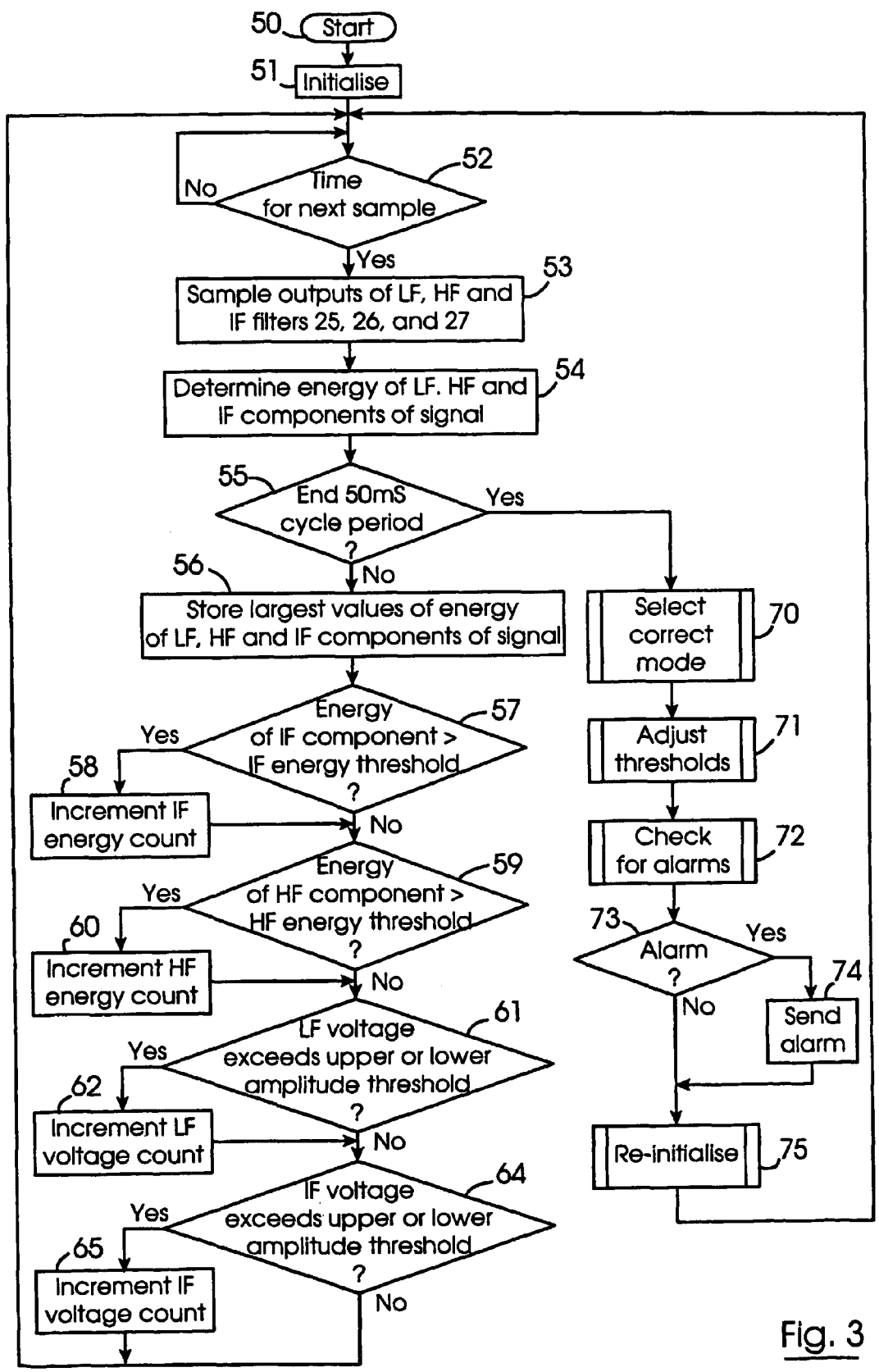
Figure 4:
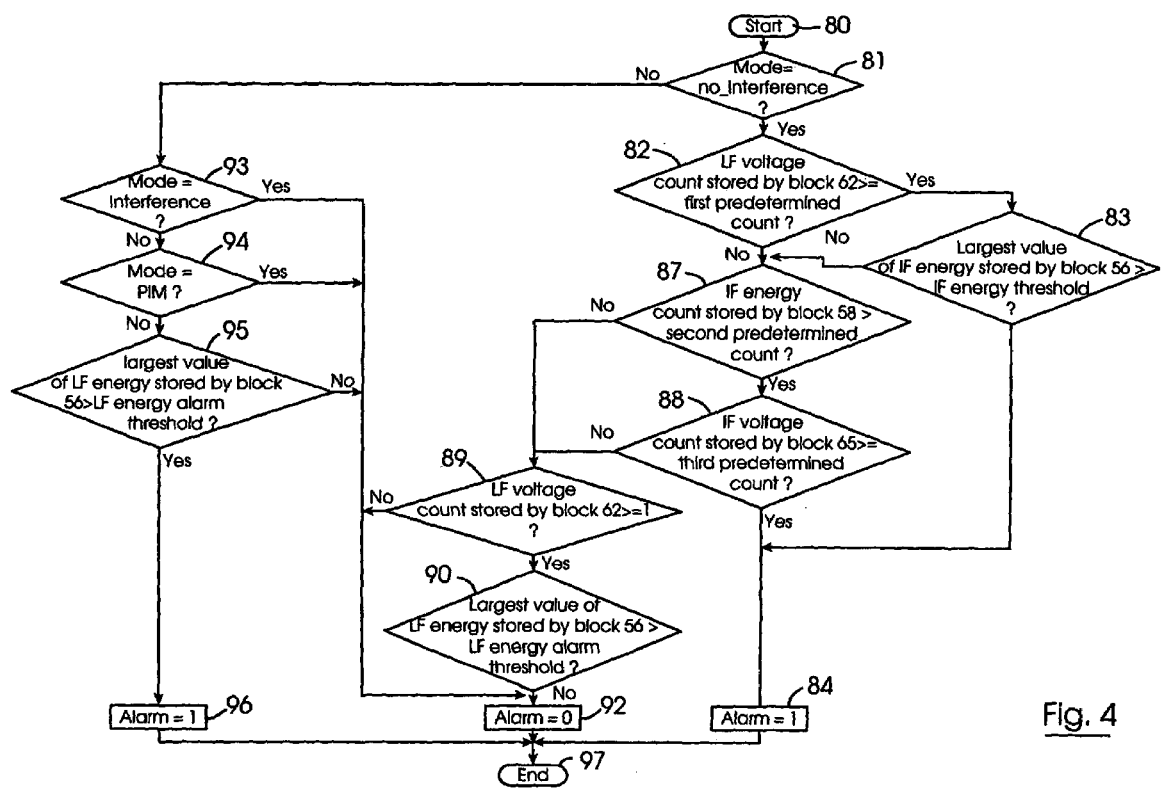
Figure 5:
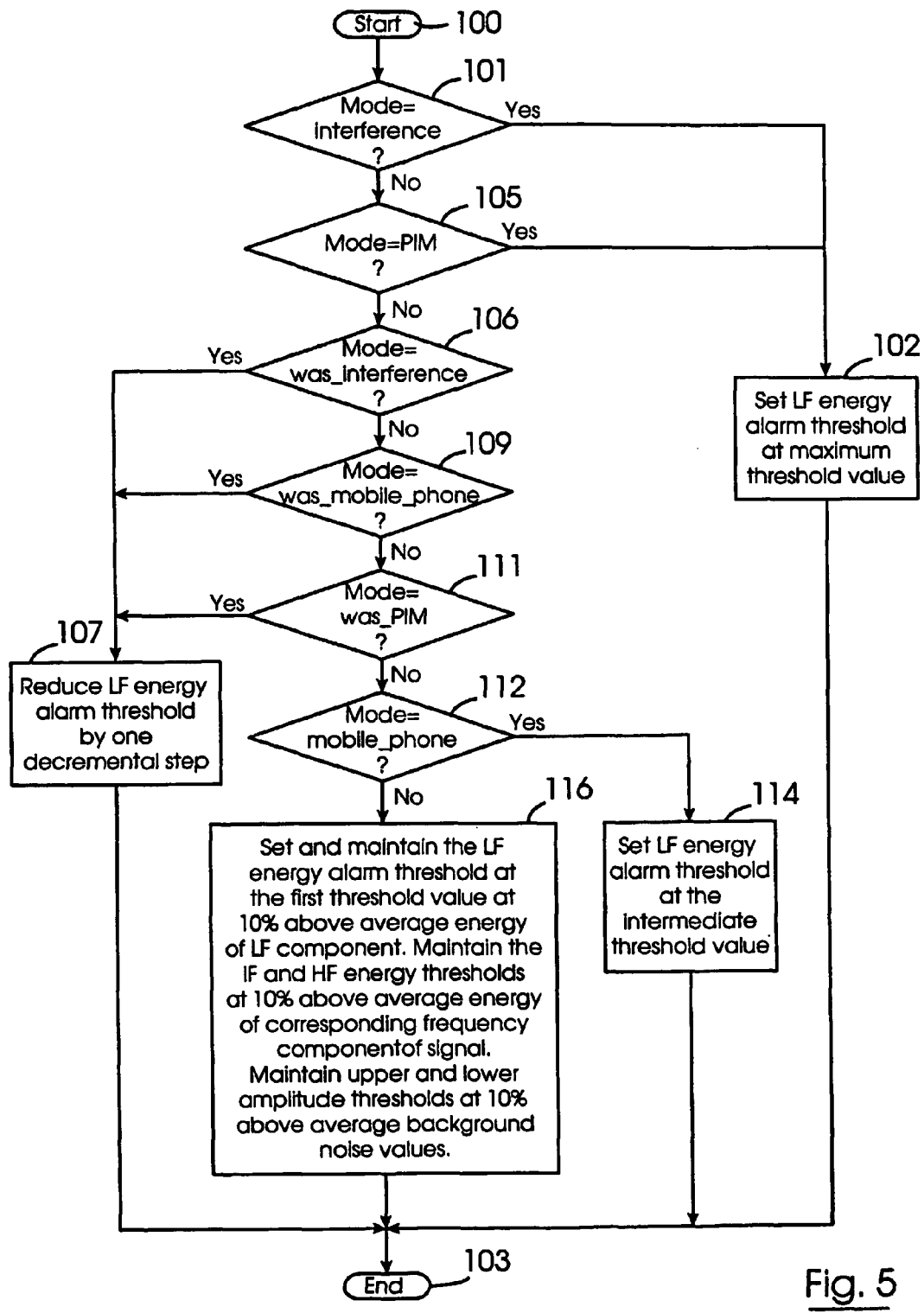

The invention will be more clearly understood from the following description of a preferred embodiment thereof, which is given by way of example only, with reference to the accompanying drawings, in which:

FIG. 1 is a circuit diagram of an anti-theft system according to the invention,

FIG. 2 is a graphical representation of a number of waveforms of signals processed by the anti-theft system of FIG. 1, FIG. 3 illustrates a flow chart of a software routine under which a microprocessor of the anti-theft system of FIG. 1 operates, FIG. 4 illustrates a flow chart of a software subroutine of the routine of FIG. 3, and FIG. 5 illustrates a flow chart of another subroutine of the software routine of FIG. 3.

Referring to the drawings and initially to FIG. 1, there is illustrated an anti-theft system according to the invention indicated generally by the reference numeral 1 for monitoring for movement in an area under surveillance, in this case in a motor vehicle, resulting from a break-in or an attempted break-in to the vehicle. The anti-theft system 1 comprises a low power microwave differential pulse Doppler movement detector indicated generally by the reference numeral 2, for detecting the movement in the vehicle. The anti-theft system 1 can distinguish between movement resulting from an attempted break-in or a break-in into the vehicle and a signal from a known spurious source, for example, interference from a known spurious source, which in this embodiment of the invention is a spurious signal caused by interference from a mobile phone signal in the motor vehicle, and as will be described below, the anti-theft system 1 can operate in the presence of mobile phone interference, and still detect movement in the vehicle resulting from an attempt to break into the vehicle or movement of a thief within the vehicle, and distinguish the movement from the mobile phone interference, and output a valid alarm signal in response to the detected movement.

The detector 2 is of the type which is disclosed in U.S. Pat. No. 5,966,090 of Thomas E. McEwan, and the disclosure in the U.S. specification is incorporated herein by reference. Briefly, the detector 2 comprises a transmitter circuit 3 and a receiver circuit 4. The transmitter circuit 3 transmits bursts of electromagnetic energy, in this case radio frequency signal bursts of two burst widths at a frequency typically of approximately 5.8 GHz. The burst widths define the maximum sensing distance of the detector 2, and in this embodiment of the invention the burst widths of the respective bursts are typically approximately 5.5 nanoseconds and 6 nanoseconds for limiting the sensing distance to 1 meter approximately. The receiver circuit 4 receives the transmitted radio frequency signal bursts and reflected signal bursts from a target in the vehicle, and the reflected signal bursts are mixed to produce a difference frequency equal to the Doppler shift produced by a moving target within the vehicle, for example, movement of a hand or arm of a thief within the vehicle.

The transmitter circuit 3 comprises a pulse repetition frequency oscillator 5 which provides a square wave pulse train at a pulse repetition rate of approximately 1.5 MHz. A noise generating element 6 modulates the output signal of the oscillator 5 in order to spread radiated spectral lines that would otherwise occur with uniform spacing equal to pulse repetition frequency. A gate generator 7 is driven by the oscillator 5 to produce the frequency bursts of approximately 6 nanoseconds under the control of a burst width control circuit 9. The burst width control circuit 9 comprises a range oscillator 10, and a range setting potentiometer 11. A summing node 12 combines the output of the range oscillator 10 and the potentiometer 11 for producing a pulse width control signal to the gate generator 7. The operation of a control circuit similar to the control circuit 9 is described in U.S. Pat. No. 5,966,090 of McEwan, and it is not intended to describe it in further detail here. The output of the gate generator 12 activates a radio frequency oscillator 14 for the duration of the pulse output from the gate generator 7, which generates the radio frequency signal at a frequency of approximately 5.8 GHz in the respective burst widths. A loop antenna transmitter 15 transmits the radio frequency signal bursts from the radio frequency generator 14, which are received on an adjacently located loop antenna receiver 17, which also receives the reflected transmitted signals reflected from the target.

Turning now to the receiver circuit 3, the sum of the transmitted radio frequency signal and the reflected transmitted radio frequency signals are fed from the loop antenna receiver 17 to a radio frequency detector 18. The radio frequency detector 18 detects the peak radio frequency envelope, and substantially holds the peak value from one burst to the next. However, the drop rate is such that it can follow the pattern frequency burst with variations established by the range oscillator 10. An intermediate frequency filter 19 is tuned to pass the burst width variation rate and to reject DC offsets from the radio frequency detector 18 and unmodulated Doppler variation. An intermediate frequency amplifier 20 amplifies the filtered signal from the intermediate frequency filter 19. The output of the intermediate frequency amplifier 20 is fed to an envelope detector 22 where one of the high or low levels of the signal from the amplifier 20 is peak detected or envelope detected to provide a resulting differential signal. The output of the envelope detector 22 corresponds to the difference in the response of the radio frequency detector 18 between the two radio frequency burst widths, or between the two sensor ranges established by the varying burst widths.

The envelope signal outputted by the envelope detector 22 is fed through three analogue filters implemented in hardware, namely, a low pass filter 25, a high pass filter 26 and a bandpass filter 27. The frequency signals outputted by the three filters 25, 26 and 27 are fed to apparatus indicated generally by the reference numeral 34 for analysis thereof for determining if the frequency signal outputted by the envelope detector 22 is indicative of movement having been detected, or if it is indicative of interference, and if the interference is mobile phone interference. The apparatus 34 and its operation is described below. The low pass filter 25 passes frequency signals of frequency predominantly in the range of 1 Hz to 40 Hz. The high pass filter passes frequency signals of frequency predominantly in the range of 100 Hz to 1,000 Hz, while the bandpass filter passes frequency signals of frequency predominantly in the range of 40 Hz to 80 Hz approximately. In general, it has been found that slow movements, for example an arm or hand of a person moving at a normal relatively slow rate are detected in the low frequency component of the signal from the envelope detector 22, in other words, in signals in the frequency range 1 to 40 Hz from the low pass filter 25. Fast movements of a hand or arm of an individual typically are detected in an intermediate frequency component of the signal from the envelope detector 22, in other words, in signals in the intermediate frequency range of 40 Hz to 80 Hz from the bandpass filter 27. Interference signals from spurious sources as well as being detected in the low and intermediate frequency ranges are also detected in the high frequency component of the signal from the envelope detector 22, in other words, in signals from the high pass filter 26. Interference signals resulting from passive intermodulation which is caused by vibrating coins or vibrating light metal objects within a vehicle are found at all frequencies from low frequencies through intermediate frequencies to high frequencies above 100 Hz. Similarly, interference signals caused by mobile phones are also found at all frequencies from low frequencies through intermediate frequencies to high frequencies above 100 Hz. However, it has been found that there is an identifiable relationship between the high frequency component and the low frequency component of the frequency signals outputted by the high pass and low pass filters 26 and 25, respectively resulting from mobile phone interference. It has been found that the ratio of the energy of the high frequency component of mobile phone interference to the energy of the low frequency component in general exceeds a predetermined ratio value. The predetermined ratio value is dependent on the method for computing the energies in the respective high frequency and low frequency components of the interference. This discovery has been made use of in the present invention in order to firstly, identify the presence of interference from a mobile phone, and secondly, to adjust the sensitivity of the anti-theft system 1 in order that the anti-theft system 1 can continue to operate in the presence of interference caused by a mobile phone, and can continue to monitor for movement in the presence of a mobile phone.

However, in the case of passive intermodulation interference the energy level of the interference signal in the three frequency ranges is such as to prevent differentiation between such passive intermodulation interference and a signal resulting from a slow or fast movement of an individual in a vehicle. Thus, the anti-theft system 1 is operated during the presence of interference caused by passive intermodulation not to output an alarm signal in order to avoid false alarms.

The apparatus 34 comprises a microprocessor 28, and the filtered signals from the filters 25, 26 and 27 are fed to the microprocessor 28 where they are processed and analysed as will be described below. An output 29 from the microprocessor 28 outputs an alarm signal to an alarm circuit 35 for activating an alarm in the event of movement being detected in the motor vehicle. The alarm circuit 35 may activate an audible and/or visual alarm, and may also activate a transmitter for transmitting a message to a central monitoring station indicating that an alarm condition exists in the vehicle.

The microprocessor 28 under the control of software which will be described below determines values of characteristics of the low, intermediate and high frequency components from the respective filters 25, 26 and 27 of the frequency signal from the envelope detector 22. In this embodiment of the invention one of the characteristics, the values of which are determined, is a characteristic indicative of the energies of the low, intermediate and high frequency components of the signal, and the other characteristic the values of which are determined is a characteristic indicative of the amplitudes of the low and intermediate frequency components of the signal. Before describing the operation of the microprocessor 28, the signals outputted by the filters 25, 26 and 27, as well as the energy levels of the signals determined by the microprocessor 28 will first be described with reference to FIG. 2.

The frequency signals outputted by the low pass filter 25, the high pass filter 26 and the bandpass filter 27 are voltage signals, and are continuously sampled by the microprocessor 28 at 2.04 millisecond intervals. The microprocessor 28 operates on a cycle period of 500 milliseconds, and on the end of each 500 millisecond cycle period, the next cycle period commences. Thus, the signals outputted by the three filters 25, 26 and 27 are each sampled two hundred and forty-four times during each 500 millisecond cycle period. Waveform A of FIG. 2 is a trace of the voltage sampled by the microprocessor 28 of the low frequency component of the frequency signal outputted by the low pass filter 25. The voltage of the intermediate frequency component of the frequency signal outputted by the bandpass filter 27 sampled by the microprocessor 28 is illustrated by waveform B of FIG. 2. Waveform C of FIG. 2 illustrates the sampled voltage of the high frequency component of the signal outputted by the high pass filter 26. Waveform D of FIG. 2 represents the energy of the low frequency component of the signal outputted by the low pass filter 25, which is derived by the microprocessor 28 from the waveform A. Waveform E of FIG. 2 represents the energy in the intermediate frequency component of the signal outputted by the bandpass filter 27, which is derived by the microprocessor 28 from the waveform B. Waveform F of FIG. 2 represents the energy in the high frequency component of the signal outputted by the high pass filter 26, which is derived by the microprocessor 28 from the waveform C. The energy in the respective low frequency, intermediate frequency and high frequency components of the signal are determined in arbitrary units by algorithms.

The algorithm for determining the value of the energy of the low frequency component of the signal is as follows. A subroutine of a main software routine which is described below with reference to FIG. 3 continuously samples the low frequency component of the frequency signal received from the low pass filter 25 at a rate of 488 samples per second, and the DC mean of the low frequency component of the signal is found. The voltage difference between each sample and the DC mean is then calculated, and these values are passed through a low pass filter implemented in software in the microprocessor 28 which operates in the frequency range 1 Hz to 40 Hz. The output of the software low pass filter is indicative of the energy present in the low frequency component of the signal outputted by the low pass filter 25. A similar subroutine determines the energy present in the intermediate frequency component of the frequency signal outputted by the bandpass filter 27. A corresponding software bandpass filter is implemented in software in the microprocessor 28, which operates in the frequency range 40 Hz to 80 Hz, and the output of the software bandpass filter is indicative of the energy present in the intermediate frequency component of the frequency signal outputted by the bandpass filter 27. The energy present in the high frequency component of the frequency signal outputted by the high pass filter 26 is determined by a subroutine of the main routine. The high frequency component of the frequency signal outputted by the high pass filter 27 is continuously sampled at a rate of 488 samples per second, and the sampled values are passed through a high pass filter implemented in software in the microprocessor 28. The software high pass filter in the microprocessor 28 has a cut-off frequency of 150 Hz. The output of the software high pass filter is indicative of the energy present in the high frequency component of the frequency signal outputted by the high pass filter 26.

Since movements of the type which it is required to detect appear in the low frequency component of the signal from the low pass filter 25 and the intermediate frequency component from the bandpass filter 27, upper and lower low frequency voltage amplitude thresholds 30 and 31, respectively, are set for the voltage of the waveform A, and upper and lower intermediate frequency voltage amplitude thresholds 32 and 33, respectively, are set for the voltage of the waveform B. The upper and lower amplitude thresholds 30, 31, 32 and 33 are set and maintained by the microprocessor 28 to be about ten percent above and below the background noise in the respective low and intermediate frequency components of the signal. Each sampled voltage from the low pass and bandpass filters 25 and 27 is compared with the corresponding upper and lower thresholds 30, 32, 33 and 34 to obtain an indication if a movement has been detected, or if interference is present. The low, intermediate and high frequency components of the signal are illustrated from time $t_0$ to $t_1$ in FIG. 2 with background noise only.

Additionally, a low frequency energy alarm threshold 40 is set for the energy of the low frequency component of the signal, namely, the waveform D, at which an alarm condition may be determined as having occurred. The low frequency energy alarm threshold is varied as will be described below in order to avoid false alarms. An intermediate frequency energy threshold 42 is set for the energy of the intermediate frequency component of the signal, namely, waveform E at which an alarm condition may also be determined as having occurred. The intermediate frequency energy threshold is set and maintained at about ten percent above the average energy of the background noise in the low frequency component of the frequency signal. A high frequency energy threshold 44 is set for the energy of the high frequency component of the signal, namely, the waveform F, at which interference is determined as being present. The high frequency energy threshold 44 is set and maintained at about ten percent above the average energy of the background noise in the high frequency component of the frequency signal.

Referring in particular to waveform A of FIG. 2 which is the sampled voltage waveform of the low frequency component of the signal from the low pass filter 25. Initially from time $t_0$ up to time $t_1$ only background noise is detected in the low frequency component of the signal, and the signal is well within the upper and lower voltage thresholds 30 and 31. Similarly, the voltage waveforms B and C of the intermediate and high frequency components of the signal sampled from the bandpass filter 27 and the high pass filter 26 from time $t_0$ to time $t_1$ show only background noise being present, and the waveform B is well within the upper and lower voltage thresholds 32 and 33. Because of the fact that only background noise is present in the detected signal, the low frequency energy alarm threshold 40 is set and maintained at a first threshold value 40' which is approximately ten percent above the average energy of the background noise in the low frequency component of the signal, for so long as only background noise is detected.

From time $t_1$ to time $t_2$ a disturbance is detected in the voltage signal of the low frequency component of the signal, waveform A, and the amplitude of the voltage signal is exceeding the upper and lower amplitude thresholds 30 and 31. However, between time $t_1$ and time $t_2$ only a small disturbance is detected in the voltage waveforms B and C of the intermediate and high frequency components of the signals, and the amplitude of waveform B is within the upper and lower amplitude thresholds 32 and 33. The energy of the low frequency component of the signal, namely, waveform D just after time $t_1$ exceeds the low frequency energy alarm threshold, which is set at the first threshold value 40' for the duration of time $t_1$ to time $t_2$. The energy in the high frequency component of the signal, waveform F, has not exceeded the high frequency energy threshold 44, thus indicating the absence of interference, for example, interference from a mobile phone signal or passive intermodulation. Therefore, since the energy of the low frequency component has exceeded the set low frequency energy alarm threshold 40' and no interference is present, and since the amplitude of the low frequency component of the signal is exceeding the upper and lower amplitude thresholds 30 and 31, a movement has been detected, and an alarm condition exists. At this stage as will be described below the microprocessor 28 outputs an alarm signal on the output 29 to the alarm circuit 35.

From time $t_2$ to time $t_3$, only background noise is detected in the low, intermediate and high frequency components of the signal, and the low frequency energy alarm thresholds 40 are left unaltered at the first threshold value of 40'.

At time $t_3$ a disturbance is detected in the voltage waveforms A, B and C of the low, intermediate and high frequency components of the signal. Since the disturbance is detected in the high frequency component of the signal, and the energy of the high frequency component, waveform F exceeds the high frequency energy threshold 44, interference is present, and in order to avoid a false alarm, the low frequency energy alarm threshold 40 is increased to a maximum threshold value 40". The maximum threshold value of the low frequency energy alarm threshold is of value such that it would not be exceeded by the energy of any low frequency component signal detected in order to avoid false alarms. During the present of any interference, in other words when the energy in the high frequency component of the signal exceeds the high frequency energy threshold 44, the intermediate frequency component of the frequency signal is ignored.

During the period $t_3$ to $t_4$ further analysis as will be described below is carried out on the high frequency and low frequency components of the signal to determine if the interference is from a know spurious source, namely, a mobile phone. In this case the interference is determined as being from a mobile phone, and because of this the low frequency energy alarm threshold 40 is set at an intermediate threshold value 40''' at time $t_4$.

Before describing the setting of the low frequency energy alarm threshold to the intermediate threshold value 40''', the determination of the interference being that of a mobile phone or otherwise will first be described. As mentioned above, it has been discovered that a mobile phone has low frequency and high frequency components, and the ratio of the energy of the high frequency component of the mobile phone interference to the energy of the low frequency component exceeds a certain predetermined ratio value. The predetermined ratio value depends on the algorithm used for determining the energy in the high and low frequency components of the interference signal, however, in this embodiment of the invention the predetermined minimum value is two. Accordingly, in order to determine if the interference is that of a mobile phone, the ratio of the energy of the high frequency component to the energy of the low frequency component is determined, and if greater than two, the interference is deemed to be from a mobile phone. Otherwise, the interference is deemed to have resulted from passive intermodulation or another unidentifiable source. As can be seen from waveforms D and F, the ratio of the energy of the high frequency component to the energy of the low frequency component of the signal from time $t_3$ to $t_5$ is greater than two, and thus, the interference is determined to be mobile phone interference.

The intermediate threshold value 40''' of the low frequency energy alarm threshold is determined such that the low frequency energy of the mobile phone interference will not exceed the low frequency energy alarm threshold when set at the intermediate threshold value 40''', thereby avoiding false alarms. In this embodiment of the invention the intermediate threshold value 40''' is derived from the energy of the high frequency component of the mobile phone interference by multiplying the energy of the high frequency component by an appropriate fractional value stored in the microprocessor 28. The fractional value is dependent on the method used in determining the energies of the high frequency and low frequency components of the frequency signal.

Thereby, with the low frequency energy threshold 40 set at the intermediate threshold value 40''' between times $t_4$ and $t_5$ slow movement can be detected. If slow movement occurred in the vehicle the energy of the low frequency component of the signal would exceed the intermediate threshold value 40''' of the low frequency alarm threshold 40. This would indicate the possible presence of an alarm condition, and depending on other checks carried out by the software in the microprocessor 28, as will be described below, an alarm signal would be outputted on the output 29 from the microprocessor 28 to the alarm circuit 35.

At time $t_5$ the mobile phone interference disappears, and only background noise is present in the three components of the signal. Thus, from time $t_5$ the low frequency energy alarm threshold 40 is progressively decremented in steps until it is again at the first threshold value of approximately ten percent above the energy of background noise, and is maintained at this value until the next disturbance is detected.

At time $t_6$ further disturbance is detected in the three components of the signal, and the energy of the high frequency component of the signal exceeds the high frequency energy threshold 44, thus indicating interference. Again the low frequency energy alarm threshold 40 is increased to the maximum threshold value 40". The ratio of the energy of the high frequency component to the energy of the low frequency component of the signal is determined to ascertain if the interference is from a mobile phone. However, in this case the interference is determined as not being from a mobile phone, and more than likely is the result of passive modulation interference. Since it is not possible to distinguish either a slow or a fast movement in the vehicle from such interference, the low frequency energy alarm threshold 40 is left set at the maximum threshold values 40" while the interference is present in order to avoid false alarms, and the intermediate frequency component of the signal is ignored.

At time $t_7$ when the interference has ceased, the low frequency energy alarm threshold 40 is progressively decremented in steps similarly as described with reference to the time period from $t_5$ to $t_6$. However, at any time while the low frequency energy alarm threshold is being decremented, if a disturbance is detected in either of the voltage waveforms A or B of the low and intermediate frequency components of the signal, and if the energy of either the low or the intermediate frequency components of the signal exceeds the corresponding low or intermediate thresholds 40 or 42, and if the energy of the high frequency component is not exceeding the high frequency energy threshold 44, an alarm condition may be determined as having been detected, and further checks as will be described below are carried out. However, if during decrementing of the low frequency energy alarm threshold, the energy of the high frequency component of the signal exceeds the high frequency energy threshold 44, indicating the presence of interference, the low frequency energy alarm threshold 40 is set to the maximum threshold value 40", and would subsequently be reduced to the intermediate threshold value 40''', if the interference was determined to be mobile phone interference.

Although a trace of the signals corresponding to detection of a fast movement in the absence of interference has not been illustrated in FIG. 2, if a fast movement were detected in the absence of interference, the voltage signal of the intermediate frequency component outputted by the bandpass filter 27, namely, the waveform B would exceed the upper and lower amplitude thresholds 32 and 33. Additionally, the energy of the intermediate frequency component of the signal illustrated in waveform E would exceed the intermediate frequency energy threshold 42, and depending on the speed of the movement, the voltage in the low frequency component of the signal, namely, waveform A may also exceed the upper and lower amplitude thresholds 30 and 31, and the energy in the low frequency component of the frequency signal, namely, waveform D may also exceed the low frequency energy alarm threshold 40, particularly if the low frequency energy alarm threshold 40 is set at the first threshold value 40'. Whether the movement signal appears in the low frequency or the high frequency component of the signal depends on the speed of the movement. The slower the movement, the greater will be the energy in the low frequency component of the frequency signal, and the faster the movement, the greater will be the energy in the intermediate frequency component of the signal. Where the speed of the movement is halfway between a very slow movement and a very fast movement, the energies in the respective low and intermediate frequency components of the signals may be substantially similar, and the disturbance caused by the movement will appear in both the low frequency and the intermediate frequency components of the frequency signal.

The operation of the microprocessor 28 under the control of the software will now be described with reference to the flow charts of FIGS. 3 to 5. As discussed above, the microprocessor 28 samples the outputs of the three filters, namely, the low pass filter 25, the bandpass filter 27, and the high pass filter 26, respectively, at 2.04 millisecond intervals during each cycle period of 500 milliseconds. Thus, during each 500 millisecond cycle period, two hundred and forty-four samples of the outputs from each of the three filters 25, 26 and 27 are taken to construct the waveforms A, B and C. Additionally, as the outputs of the filters 25, 26 and 27 are being sampled the energies of the low, intermediate and high frequency components of the signal are computed using the algorithms which have already been described in order to construct the waveforms D, E and F of FIG. 2.

Referring initially to FIG. 3, the flow chart of FIG. 3 illustrates the main software routine under which the microprocessor 28 operates in order to determine if a valid alarm condition has been detected. The flow chart of FIG. 3 illustrates one cycle in which the respective outputs of the three filters 25, 26 and 27 are sampled once, as discussed above during a cycle period the software goes through the routine of FIG. 3 two hundred and forty-four times. Block 50 commences the routine, and the routine moves to block 51 which initialises the microprocessor 28, and sets counters and stored values from the previous cycle period to zero. The routine then moves to block 52. Block 52 checks if it is time for the next sample, and if not, waits until the next sample is due to be taken, at which stage the routine moves to block 53. Block 53 samples the voltages of the outputs of the filters 25, 26 and 27, which are similar to the waveforms A, B and C of the low frequency, intermediate frequency and high frequency components of the signal. Block 54 applies the algorithms for determining the energy of the respective low, intermediate and high frequency components of the signal for computing the energy waveforms D, E and F. After the energy of the low, intermediate and high frequency components of the signal have been determined by block 54, the routine moves to block 55 which checks if a cycle period has been completed. If not, the routine moves to block 56 which stores the largest value so far computed of energy for the low frequency, intermediate frequency and high frequency components of the signal.

The routine then moves to block 57 which checks if the just computed energy value of the intermediate frequency component of the signal exceeds the intermediate frequency energy threshold 42. If so, the routine moves to block 58 which increments a count of the number of times during the cycle period the energy of the intermediate frequency component of the signal exceeds the intermediate frequency energy threshold 42. The routine then moves to block 59. If block 57 determines that the energy just computed of the intermediate frequency component of the signal is equal to or less than the intermediate frequency energy threshold 42, block 57 moves the routine to block 59.

Block 59 checks if the high frequency energy value just computed exceeds the high frequency energy threshold 44, and if so, the routine moves to block 60 which increments the count of the number of times the energy of the high frequency component of the signal exceeds the high frequency energy threshold 44 during the cycle period, and the routine then moves to block 61. If block 59 determines that the just computed energy value of the high frequency component of the signal is equal to or less than the high frequency energy threshold 44, the routine is moved to block 61.

Block 61 checks if the just sampled voltage of the low frequency component of the signal, namely waveform A, exceeds the upper or lower thresholds 30 and 31. If so, the routine moves to block 62 which increments a count of the number of times the voltage of the low frequency component of the signal exceeds the upper and lower thresholds 30 and 31 during a cycle period. The routine then moves to block 64. If block 61 determines that the voltage of the low frequency component of the signal, namely, the waveform A is within the upper and lower thresholds 30 and 31, the routine moves to block 64.

Block 64 checks if the just sampled value of the voltage of the intermediate frequency component of the signal, namely, waveform B exceeds the upper or lower thresholds 32 or 33, and if so, the routine moves to block 65. Block 65 increments a count of the number of times the voltage of the intermediate frequency component of the signal exceeded the upper and lower thresholds 32 and 33 during the cycle period. The routine then returns to block 52 and waits until it is time to take the next samples. If block 64 determines that the voltage of the intermediate frequency component of the signal was within the upper and lower voltage thresholds 32 and 33, the routine is returned to block 52.

During each return to block 52 a counter (not shown) increments the number of passes of the routine until the two hundred and forty-fourth pass has been made, which ends a cycle period of 500 milliseconds. On the two hundred and forty-fourth pass having been made, the counter is reset to zero.

If block 55 had determined that the cycle period of 500 milliseconds had been completed, in other words, the routine had gone through two hundred and forty-four passes, the routine is moved to block 70. Block 70 calls up a subroutine which selects the mode in which the anti-theft system 1 is to operate during the next cycle period. The routine then moves to block 71 which calls up a subroutine which resets the low frequency energy alarm threshold 40 for the next cycle period. This subroutine is described below. The routine then moves to block 72 which calls up a subroutine to check if an alarm condition has been determined. This subroutine is also described below. After block 72 the routine moves to block 73 which checks if the subroutine called up by block 72 determined that an alarm condition has been detected. If so, the routine moves to block 74 which outputs an alarm signal to the alarm circuit 35 on the output 29 from the microprocessor 28. Otherwise, the routine moves to block 75 which resets the counters to zero and the stored value stored during the just completed cycle period to zero, and the routine is then returned to block 52 to wait until it is time to take the next samples.

Turning now to FIG. 4, a flow chart of the subroutine called up by block 72 to check if an alarm condition has been determined is illustrated. The subroutine of FIG. 4 starts with block 80 and moves to block 81. Block 81 checks the mode in which the anti-theft system 1 is operating. The modes in which the anti-theft system 1 can operate will be described in more detail below. Block 81 checks if the mode in which the anti-theft system is operating is a NO_INTERFERENCE mode. A NO_INTERFERENCE mode is a mode whereby no interference is detected and the low frequency energy alarm threshold 40 is set at the first threshold value 40', in other words, at approximately 10% above the energy of the background noise in the low frequency component of the signal. As illustrated in FIG. 2 the anti-theft system is operating in the NO_INTERFERENCE mode during the time period $t_0$ to $t_1$ when no interference is detected, and the low frequency energy alarm threshold 40 is set at the first threshold value 40'. If the block 81 determines that the anti-theft system is operating in the NO_INTERFERENCE mode, the subroutine moves to block 82, and checks the count stored by block 62 of the routine of FIG. 3 of the number of times the voltage of the low frequency component of the signal, namely, waveform A exceeded the upper and lower voltage thresholds 30 and 31 during the just completed cycle period. If the count is greater than or equal to a first predetermined count which typically is in the range of two to eight, the subroutine moves to block 83 which checks if the maximum value of the energy of the low frequency component of the signal stored by block 56 of the routine of FIG. 3 during the just completed cycle period exceeded the set low frequency energy alarm threshold 40. If so, the subroutine moves to block 84 which indicates that an alarm condition has been determined. Since block 83 is only accessed when the anti-theft system is operating in a NO_INTERFERENCE mode, the threshold value of the low frequency energy alarm threshold 40 against which the stored maximum value of the energy of the low frequency component of the signal is compared, is the first threshold value 40', which is the value of the low frequency energy alarm threshold when set at approximately 10% above the background noise energy.

If, on the other hand, block 82 determines that the count of the number of times the voltage of the low frequency component of the signal stored by block 62 of the routine of FIG. 3 was less than the first predetermined count, or if block 83 determines that the maximum value of energy of the low frequency component of the signal stored by block 56 of the routine of FIG. 3 was less than or equal to the low frequency energy alarm threshold 40, the subroutine moves to block 87. Block 87 checks if the count of the number of times the energy of the intermediate frequency component of the signal exceeded the intermediate frequency energy threshold stored by block 58 of the subroutine of FIG. 3 exceeds a second predetermined count, which typically lies in the range two to eight, during the just completed cycle period. If so, the subroutine moves to block 88 which checks if the count of the number of times the voltage of the intermediate frequency component of the signal exceeded the upper and lower amplitude thresholds 32 and 33 stored by block 65 of the routine of FIG. 3 is greater than or equal to a third predetermined count, which typically lies between two and eight, during the just completed cycle period. If so, the subroutine moves to block 84 which determines that an alarm condition has been detected. If block 87 determines that the count is less than or equal to the second predetermined count, or if block 88 determines that the count is less than the third predetermined count, then the subroutine is moved to block 89.

Block 89 checks if the count of the number of times the voltage of the low frequency component of the signal stored by block 62 of the routine of FIG. 3 during the just completed cycle period is greater than or equal to one, and if so, the subroutine moves to block 90. Block 90 checks if the maximum value of the energy of the low frequency component of the signal stored by block 56 of the routine of FIG. 3 during the just completed cycle period exceeded the set low frequency energy alarm threshold 40, and if so, the subroutine moves to block 84 which determines that an alarm condition has been detected. If block 89 determined that during the just completed cycle period the voltage of the low frequency component of the signal did not exceed the voltage upper and lower amplitude thresholds 30 and 31, the subroutine is moved to block 92 which determines that an alarm condition has not been detected. Similarly, if block 90 determines that the maximum value of the energy of the low frequency component of the signal stored during the just completed cycle period is equal to or less than the set low frequency energy alarm threshold 40, the subroutine is moved to block 92.

On the other hand, if block 81 determines that the anti-theft system 1 was not in a NO_INTERFERENCE mode, the subroutine is moved to block 93. Block 93 checks if the anti-theft system 1 is in an INTERFERENCE mode. The INTERFERENCE mode is a mode when it is determined that the anti-theft system 1 is operating in the presence of interference. In the INTERFERENCE mode the low frequency energy alarm threshold 40 is set to the maximum threshold value, in other words, to the value 40" as, for example, between time $t_3$ and $t_4$ of FIG. 2. In other words, when it is possible that the interference is mobile phone interference. If block 93 determines that the anti-theft system is in the INTERFERENCE mode, since it is not possible to detect a slow movement in this mode, and since in this mode the intermediate frequency component of the signal is ignored, the subroutine is moved to block 92 which determines that an alarm condition has not been detected. This is due to the fact that because of the level of interference, an alarm condition cannot be detected without the possibility of the alarm being a false alarm. If block 93 determines that the anti-theft system is not in the INTERFERENCE mode, the subroutine moves to block 94 which checks if the subroutine is in a PIM mode. This is a mode in which interference is caused by a signal from a spurious source which cannot be identified, for example, by passive modulation. This is the mode in which the anti-theft system is operating during the period from time $t_6$ to $t_7$ of FIG. 2. In other words, it is the time period during which the low frequency energy alarm threshold 40 is set at the maximum value, namely, 40". If block 94 determines that the anti-theft system 1 is operating in the PIM mode, the subroutine moves to block 92 which determines that an alarm condition has not been detected. As already described, this is because an alarm condition cannot be detected without the possibility of the alarm condition being a false alarm. If block 94 determines that the mode in which the anti-theft system is operating is not the PIM mode, the subroutine moves to block 95 which checks if the maximum value of the energy of the low frequency component of the signal stored by block 56 of the routine of FIG. 3 during the just completed cycle period exceeded the set low frequency energy alarm threshold 40, and if so, the subroutine moves to block 96 which determines that an alarm condition has been detected. Otherwise, the subroutine moves to block 92 which determines that no alarm condition has been detected.

After blocks 84, 92 and 96, the subroutine moves to block 97 which ends the subroutine, and returns control of the microprocessor 28 to the routine of FIG. 3, which then moves to block 73, which has already been described.

The modes in which the anti-theft system 1 can operate will now be described. In total the anti-theft system 1 can operate in seven modes. The seven modes are as follows:

1. NO_INTERFERENCE mode, this is the mode in which the anti-theft system 1 operates when no interference is present. The anti-theft system 1 is operating in the NO_INTERFERENCE mode between time to and t, in FIG. 2. In this mode the low frequency energy alarm threshold 40 is set to its first threshold value 40'.
2. INTERFERENCE mode, this is the mode in which the anti-theft system 1 is operating when interference is present, and the interference cannot be identified as mobile phone interference, and is such as to prevent a determination of an alarm condition being made without the risk of a false alarm. The anti-theft system 1 is operating in the INTERFERENCE mode during the time period $t_6$ to $t_7$ of FIG. 2. In the INTERFERENCE mode the low frequency energy alarm threshold 40 is set at its maximum threshold value 40".
3. WAS_INTERFERENCE mode, the anti-theft system 1 is set to operate in the WAS_INTERFERENCE mode when the interference which caused the anti-theft system 1 to be operated in the INTERFERENCE mode has ceased. The anti-theft system 1 is not illustrated operating in the WAS_INTERFERENCE mode, however, operation of the anti-theft system 1 in the WAS_INTERFERENCE mode would be similar to the operation of the anti-theft system 1 during the time period from $t_7$ onwards in FIG. 2. During the WAS_INTERFERENCE mode the low frequency energy alarm threshold 40 is progressively decremented from the maximum threshold value 40" in decremental steps. In the event of no further interference being detected during the WAS_INTERFERENCE mode, the low frequency energy alarm threshold 40 is decremented to the first threshold value 40'.
4. MOBILE_PHONE mode, in this mode the interference has been determined as being that caused by a strong mobile phone signal. The anti-theft system 1 is operating in the MOBILE_PHONE mode during the period $t_4$ to $t_5$ of FIG. 2. In this mode the low frequency energy alarm threshold 40 is set to the intermediate threshold value 40'''.
5. WAS_MOBILE_PHONE mode, the anti-theft system 1 is set to operate in the WAS_MOBILE_PHONE mode when the interference caused by the strong mobile phone signal which caused the anti-theft system 1 to be operated in the MOBILE_PHONE mode has ceased. The anti-theft system 1 is operating in the WAS_MOBILE_PHONE mode during the time period from $t_5$ to $t_6$ of FIG. 2. During the WAS_MOBILE_PHONE mode the low frequency energy alarm threshold 40 is progressively decremented from the intermediate threshold value in decremental steps. In the event of no further interference being detected during the WAS_MOBILE_PHONE mode, the low frequency energy alarm threshold 40 is decremented to the first threshold value 40'.
6. PIM mode, this mode is similar to the INTERFERENCE mode, however, the anti-theft system 1 is operated in the PIM mode when the interference cannot be identified as being mobile phone interference. The anti-theft system 1 is operating in the PIM mode during the time period $t_6$ to $t_7$. In the PIM mode the low frequency energy alarm threshold 40 is set at the maximum threshold value 40".
7. WAS_PIM mode, the anti-theft system 1 is set to operate in the WAS_PIM mode when the interference which caused the anti-theft system 1 to operate in the PIM mode has ceased. The anti-theft system 1 is operating in the WAS_PIM mode during the time period from $t_7$ onwards in FIG. 2. During the WAS_PIM mode the low frequency energy alarm threshold 40 is progressively decremented from the maximum threshold value 40" in decremental steps. In the event of no further interference being detected during the WAS_PIM mode, the low frequency energy alarm threshold 40 is decremented to the first threshold value 40'.

Referring now to FIG. 5, a flow chart of the subroutine called up by block 71 of the routine of FIG. 3 on completion of each cycle period for resetting the low frequency energy alarm threshold 40 is illustrated. Block 100 starts the subroutine, and the subroutine moves to block 101 which checks if the mode selected by block 70 of the routine of FIG. 3 is the INTERFERENCE mode. If so, the subroutine moves to block 102 which sets the low frequency energy alarm threshold 40 at the maximum threshold value, namely, the value 40". The subroutine then moves to block 103 which terminates the subroutine, and hands back control of the microprocessor 28 to the routine of FIG. 3, which then moves to block 72. If block 101 determines that the mode selected by block 70 is not the INTERFERENCE mode, the subroutine moves to block 105 which checks if the mode selected by block 70 is the PIM mode. If so, the subroutine also moves to block 102 which as already described, sets the low frequency energy alarm threshold at the maximum threshold value. Thus, when the INTERFERENCE mode and the PIM modes are selected, the low frequency energy alarm threshold 40 is set to the maximum threshold value in order to avoid false alarms.

If block 105 determines that the mode selected by block 70 is not the PIM mode, the subroutine moves to block 106. Block 106 checks if the mode selected by block 70 is the WAS_INTERFERENCE mode, and if so, moves to block 107 which reduces the low frequency energy alarm threshold 40 by one decremental step, until the low frequency energy alarm threshold is reduced to the first threshold value, and the subroutine moves to block 103 which as already described, hands control of the microprocessor 28 back to the routine of FIG. 3 which proceeds to block 72.

If block 106 determines that the mode selected by block 70 was not the WAS_INTERFERENCE mode, the subroutine moves to block 109 which checks if the mode selected by block 70 is the WAS_MOBILE_PHONE mode, and if so, the subroutine moves to block 107 which has already been described. If block 109 determines that the mode selected by block 70 is not the WAS_MOBILE_PHONE MODE, the subroutine moves to block 111 which checks if the mode selected by block 70 is the WAS_PIM mode. If so, the subroutine moves to block 107 which has already been described. Otherwise, the subroutine moves to block 112.

Block 112 checks if the mode selected by block 70 is the MOBILE_PHONE mode. If so, the subroutine moves to block 114 which sets the low frequency energy alarm threshold 40 to the intermediate threshold value 40'''. If block 112 determines that the mode selected by block 70 is not the MOBILE_PHONE mode, the subroutine moves to block 116. In which case, the only remaining mode in which the anti-theft system 1 can be operated is the NO_INTERFERENCE mode. Thus, block 116 calls up a subroutine for setting and maintaining the low frequency energy alarm threshold 40 at the first threshold value, which is set and maintained at a value of approximately 100% above the average energy of the background noise in the low frequency energy component of the signal. This is carried out by monitoring the energy of the background noise over a predetermined number of cycle periods and averaging the noise energy, and then determining 110% of the average noise energy, and setting the low frequency energy alarm threshold 40 at that value. Thus, as the background noise energy in the low frequency component of the signal varies, the first threshold value 40' the low frequency energy alarm threshold 40 is likewise varied. Similarly, block 116 sets and maintains the intermediate frequency energy threshold 42 at a value of approximately 110% of the average energy of the background noise in the intermediate frequency component of the signal. Block 116 also sets and maintains the high frequency energy threshold 44 at a value of approximately 110% of the average energy of the background noise in the high frequency component of the signal. Block 116 also maintains the upper and lower amplitude thresholds 30, 31, 32 and 33 of the voltage of the low frequency and intermediate frequency components of the signal at 10% above and below the background noise values of the respective voltage signals. The subroutine then moves to block 103 which as already described, returns control of the microprocessor 28 to the routine of FIG. 3 at block 72.

Accordingly, by virtue of the fact that the microprocessor 28 under the control of the software can identify interference caused by a mobile phone, and then sets the low frequency energy alarm threshold at the intermediate threshold value which is above the energy of the low frequency component of the mobile phone signal, false alarms are avoided during the presence of a mobile phone signal, and furthermore, and most importantly, the anti-theft system 1 continues to operate to detect slow movements in the vehicle indicative of an unauthorised attempt to gain entry to or to enter the vehicle, and in the event of detecting such movement, an alarm signal is outputted for activating an alarm and/or a radio transmitter for transmitting a signal to a central monitoring station or elsewhere alerting to the alarm condition. Monitoring for an alarm condition is only suspended during interference, the source of which cannot be determined as being a mobile phone, such as passive intermodulation caused by coins or small metallic articles being vibrated within the vehicle, or other such similar type interference, and thus false alarms are avoided.

While the method and apparatus for determining if movement has been detected in an area under surveillance by a movement detector and for distinguishing a signal resulting from movement from a signal resulting from a spurious source has been described for use in an anti-theft system for a motor vehicle, the method and the apparatus may be used for detecting movement in any area under surveillance, and for distinguishing a movement signal from a signal resulting from a spurious source, for example, interference caused by a mobile phone, it is envisaged that signals resulting from interference from other spurious sources may also be determined.

Additionally, while a specific movement detector circuit has been described with reference to FIG. 1, it will be readily appreciated by those skilled in the art that the method according to the invention for determining if movement has been detected in an area under surveillance and distinguishing a signal resulting from a spurious source may be used for analysing a signal received from any other suitable type of detector circuit. Indeed, it is envisaged that the method may be used in conjunction with any of the detector circuits described in U.S. Pat. No. 5,966,090 of McEwan, or indeed, any other suitable detector circuit.

While the anti-theft system has been described for use in a motor vehicle, the anti-theft system may be used for monitoring for movement in any area under surveillance, and the area being monitored would be determined by the burst widths of the radio frequency signals.

Additionally, while the various signals have been described as being of specific frequencies, other frequencies may be used without departing from the scope of the invention.

It will be appreciated that while the anti-theft system has been described as operating the microprocessor under the control of software such that both a low frequency component and an intermediate frequency component of the frequency signal is analysed for detecting and differentiating between fast and slow movements, it will be appreciated that in certain cases, only low frequency components may be analysed. It will also be appreciated that the frequency range of the low frequency components, the intermediate frequency components and the high frequency components may be varied.

It is also envisaged that the analysis of the high frequency and low frequency components of an interference signal resulting from mobile phone interference may be analysed for the purpose of determining whether the mobile phone signal is a strong signal or a weak signal. This will be determined by comparing the ratio of the energy of the high frequency component to the energy of the low frequency component of the mobile phone interference signal with two predetermined ratio values. One of the predetermined ratio values would be set so that energy ratios over that predetermined ratio value would be indicative of a strong mobile phone signal, while the other predetermined ratio would be set such that ratios over that predetermined ratio value would be indicative of weak mobile phone signals. In which case, the intermediate value of the low frequency energy alarm threshold would be derived from the energy of the high frequency component of the mobile phone interference signal using two fractional values, one for a strong signal, and one for a weak signal.

The invention claimed is:

1. A method for analysing a frequency signal from a movement detector for determining if movement has been detected in an area under surveillance by the movement detector, and for distinguishing a signal resulting from movement from a signal resulting from a spurious source, characterised in that the method comprises the steps of:
   determining a value of a characteristic of a low frequency component of the frequency signal,
   comparing the determined value of the characteristic of the low frequency component with a set threshold value of a low frequency alarm threshold for determining if the determined value of the characteristic of the low frequency component is indicative of movement having been detected,
   determining a value of a characteristic of a high frequency component of the frequency signal to ascertain if the value of the characteristic of the high frequency component is indicative of a signal from a known spurious source having been detected, and setting the low frequency alarm threshold at an intermediate threshold value, if the determined value of the characteristic of the high frequency component is indicative of a signal from a known spurious source, the intermediate threshold value being greater than the value of a corresponding characteristic of a low frequency component of the frequency signal resulting from the signal from the known spurious source for preventing a false alarm.

2. A method as claimed in claim 1 in which the method further comprises outputting an alarm signal in response to the determined value of the characteristic of the low frequency component of the frequency signal exceeding the low frequency alarm threshold when the low frequency alarm threshold is set at the intermediate threshold value.

3. A method as claimed in claim 1 in which an alarm signal is outputted in response to the determined value of the characteristic of the low frequency component of the frequency signal exceeding the low frequency alarm threshold when the low frequency alarm threshold is set at a first threshold value, and when the determined characteristic of the high frequency component of the frequency signal does not exceed a high frequency threshold, the first threshold value of the low frequency alarm threshold being less than the intermediate threshold value thereof.

4. A method as claimed in claim 1 in which the first threshold value of the low frequency alarm threshold is set at a value above the background noise level in the low frequency component of the frequency signal in the absence of a spurious signal.

5. A method as claimed in claim 1 in which the determined value of the characteristic of the high frequency component of the frequency signal is compared with the corresponding determined characteristic of the low frequency component of the frequency signal for determining if the frequency signal has resulted from a signal from a known spurious source.

6. A method as claimed in claim 1 in which the set threshold value of the low frequency alarm threshold is reduced when a signal from a spurious source is determined as having ceased.

7. A method as claimed in claim 1 in which the characteristic, the value of which is determined in respect of the low frequency component of the frequency signal is a characteristic indicative of the energy of the low frequency component of the frequency signal, and the low frequency alarm threshold is an energy threshold.

8. A method as claimed in claim 1 in which the characteristic, the value of which is determined in respect of the high frequency component of the frequency signal is a characteristic indicative of the energy of the high frequency component of the frequency signal, and the high frequency threshold is an energy threshold.

9. A method as claimed in claim 1 in which the frequency signal is passed through a low pass filter for providing the low frequency component of the frequency signal, and the frequency signal is passed through a high pass filter for providing the high frequency component of the frequency signal, and the frequency signal is passed through a bandpass filter for providing the intermediate frequency component of the frequency signal.

10. A method as claimed in claim 1 in which the frequency signal is derived from a microwave movement detector.

11. Apparatus for analysing a frequency signal from a movement detector for determining if movement has been detected in an area under surveillance by the movement detector, and for distinguishing a signal resulting from movement from a signal resulting from a spurious source, characterised in that the apparatus comprises:

a means for determining a value of a characteristic of a low frequency component of the frequency signal, a first comparing means for comparing the determined value of the characteristic of the low frequency component with a set threshold value of a low frequency alarm threshold for determining if the determined value of the characteristic of the low frequency component is indicative of movement having been detected, a means for determining a value of a characteristic of a high frequency component of the frequency signal to ascertain if the value of the characteristic of the high frequency component is indicative of a signal from a known spurious source having been detected, and a means for setting the low frequency alarm threshold at an intermediate threshold value, if the determined value of the characteristic of the high frequency component is indicative of a signal from a known spurious source, the intermediate threshold value being greater than the value of a corresponding characteristic of a low frequency component of the frequency signal resulting from the signal from the known spurious source for preventing a false alarm.

12. Apparatus as claimed in claim 11 in which a means is provided for outputting an alarm signal, the means for outputting the alarm signal being responsive to the determined value of the characteristic of the low frequency component of the frequency signal exceeding the low frequency alarm threshold when the low frequency alarm threshold is set at the intermediate threshold value.

13. Apparatus as claimed in claim 12 in which the means for outputting the alarm signal is responsive to the determined value of the characteristic of the low frequency component of the frequency signal exceeding the low frequency alarm threshold when the low frequency alarm threshold is set at a first threshold value, and when the determined characteristic of the high frequency component of the frequency signal does not exceed a high frequency threshold, the first threshold value of the low frequency alarm threshold being less than the intermediate threshold value thereof.

14. Apparatus as claimed in claim 11 in which the means for setting the threshold value of the low frequency alarm threshold sets the low frequency alarm threshold at the first threshold value, which is a value above the background noise level in the low frequency component of the frequency signal, in the absence of spurious signals.

15. Apparatus as claimed in claim 11 in which a third comparing means is provided for comparing the determined value of the characteristic of the high frequency component of the frequency signal with the corresponding determined characteristic of the low frequency component of the frequency signal for determining if the frequency signal has resulted from a signal from a known spurious source.

16. Apparatus as claimed in claim 11 in which the means for setting the threshold value of the low frequency alarm threshold reduces the low frequency alarm threshold in response to a signal from a spurious source having ceased.

17. Apparatus as claimed in claim 11 in which the means for determining the value of the characteristic which is determined in respect of the low frequency component of the frequency signal determines the value of a characteristic indicative of the energy of the low frequency component of the frequency signal, and the low frequency alarm threshold is an energy threshold.

18. Apparatus as claimed in claim 11 in which the means for determining the value of the characteristic which is determined in respect of the high frequency component of the frequency signal determines the value of a characteristic indicative of the energy of the high frequency component of the frequency signal, and the high frequency threshold is an energy threshold.

19. Apparatus as claimed in claim 11 in which a low pass filter is provided for filtering the frequency signal for producing the low frequency component of the frequency signal, and a high pass filter is provided for filtering the frequency signal for producing the high frequency component of the frequency signal, and a bandpass filter is provided for filtering the frequency signal for producing the intermediate frequency component of the frequency signal.

20. Apparatus as claimed in claim 11 in which a microwave movement detector is provided for providing the frequency signal.

21. An anti-theft system comprising a transmitter circuit for transmitting a sequence of bursts of electromagnetic energy to produce a sensor field, the transmitted bursts having burst widths which vary according to a pattern, a receiver circuit for receiving a combination of the transmitted bursts and reflections of the transmitted bursts and for producing a combined output frequency signal, and apparatus as claimed in claim 11 for receiving and analysing the frequency signal.

22. A method as claimed in claim 3 in which the determined value of the characteristic of the high frequency component of the frequency signal is compared with the high frequency threshold for determining if the value of the characteristic of the high frequency component is indicative of a signal from a spurious source, and if the determined value of the characteristic of the high frequency component exceeds the high frequency threshold, the low frequency alarm threshold is set at a maximum threshold value, the maximum threshold value of the low frequency alarm threshold being greater than the intermediate threshold value thereof for preventing false alarms.

23. A method as claimed in claim 22 in which the maximum threshold value of the low frequency alarm threshold is greater than the greatest value of the characteristic of the low frequency component of frequency signals likely to be encountered.

24. A method as claimed in claim 1 in which the frequency range of the low frequency component of the frequency signal is selected for determining slow movements within the area under surveillance.

25. A method as claimed in claim 1 in which the method further comprises the step of determining the value of a characteristic of an intermediate frequency component of the frequency signal, and comparing the determined value of the characteristic of the intermediate frequency component with an intermediate frequency threshold for determining if the determined value of the characteristic of the intermediate frequency component of the frequency signal is indicative of a fast movement having been detected.

26. A method as claimed in claim 25 in which the low, high and intermediate frequency components of the frequency signal are sampled at predetermined intervals during a predetermined cycle period, and preferably, the maximum value of the characteristic determined during each cycle period for each frequency component is recorded, and the alarm signal is outputted in response to the recorded maximum values.

27. A method as claimed in claim 25 in which the intermediate frequency range of the frequency signal is in the range of 40 Hz to 100 Hz, the low frequency range of the frequency signal is in the range up to 100 Hz, and the high frequency range of the frequency signal exceeds 100 Hz.

28. A method as claimed in claim 1 in which the characteristic, the value of which is determined in respect of the low frequency component of the frequency signal is a characteristic indicative of the amplitude of the low frequency component of the frequency signal, and the low frequency alarm threshold is an amplitude threshold.

29. A method as claimed in claim 25 in which the characteristic, the value of which is determined in respect of the intermediate frequency component of the frequency signal is a characteristic indicative of the energy of the intermediate frequency component of the frequency signal, and the intermediate frequency threshold is an energy threshold.

30. A method as claimed in claim 26 in which the number of times the determined value of the characteristic indicative of the amplitude of the low frequency component of the frequency signal exceeds the set amplitude threshold value of the low frequency alarm threshold is recorded during each cycle period, and the alarm signal is outputted in response to the recorded number of times the determined value of the characteristic indicative of the amplitude exceeds the set amplitude threshold value of the low frequency alarm threshold.

31. Apparatus as claimed in claim 13 in which a second comparing means is provided for comparing the determined value of the characteristic of the high frequency component of the frequency signal with the high frequency threshold for determining if the value of the characteristic of the high frequency component is indicative of a signal from a spurious source, and if the determined value of the characteristic of the high frequency component exceeds the high frequency threshold, the means for setting the threshold value of the low frequency alarm threshold sets the low frequency alarm threshold at a maximum threshold value, the maximum threshold value of the low frequency alarm threshold being greater than the intermediate threshold value thereof for preventing false alarms.

32. Apparatus as claimed in claim 11 in which a means for determining the value of a characteristic of an intermediate frequency component of the frequency signal is provided, and a fourth comparing means is provided for comparing the determined value of the characteristic of the intermediate frequency component with an intermediate frequency threshold for determining if the determined value of the characteristic of the intermediate frequency component of the frequency signal is indicative of fast movement having been detected.

33. Apparatus as claimed in claim 32 in which a sampling means is provided for sampling the low, high and intermediate frequency components of the frequency signal at predetermined intervals during a predetermined cycle period, and a storing means is provided for storing the maximum value of the characteristic determined during each cycle period for each frequency component, and the means for outputting the alarm signal is responsive to the stored maximum values.

34. Apparatus as claimed in claim 11 in which the means for determining the value of the characteristic which is determined in respect of the low frequency component of the frequency signal determines the value of a characteristic indicative of the amplitude of the low frequency component of the frequency signal, and the low frequency alarm threshold is an amplitude threshold.

35. Apparatus as claimed in claim 32 in which the means for determining the value of the characteristic which is determined in respect of the intermediate frequency component of the frequency signal determines the value of a characteristic indicative of the energy of the intermediate frequency component of the frequency signal, and the intermediate frequency threshold is an energy threshold.

36. Apparatus as claimed in claim 32 in which the means for determining the value of the characteristic which is determined in respect of the intermediate frequency component of the frequency signal determines a characteristic indicative of the amplitude of the intermediate frequency component of the frequency signal, and the intermediate frequency threshold is an amplitude threshold.

* * * * *

UNITED STATES PATENT AND TRADEMARK OFFICE
CERTIFICATE OF CORRECTION

PATENT NO.         : 7,123,145 B2
APPLICATION NO. : 10/492177
DATED              : October 17, 2006
INVENTOR(S)        : Peter Joseph Reilly et al.

It is certified that error appears in the above-identified patent and that said Letters Patent is hereby corrected as shown below:

On the title page item [57] should read:

Abstract

An anti-theft system (1) for a motor vehicle detects movement in the motor vehicle, while at the same time avoiding false alarms. A movement detector (2) ~~comprises~~includes a transmitter circuit (3) which transmits a microwave signal in bursts of around six nanoseconds duration and a receiver circuit (4) which receives the transmitted signals and reflected signals. The transmitted and reflected signals are mixed, and envelope detected in an envelope detector (22). The signals from the envelope detector (22) are passed through three filters, namely, a low pass filter (25) which passes low frequency signals in the range of 1 Hz to 40 Hz, a high pass filter (26) which passes high frequency signals of greater than 100 Hz and a ~~band pass~~bandpass filter ~~15~~ (27) which passes intermediate frequency signals in the range of 40 Hz to 80 Hz. The signals from the filters (25,26,27) are analysed in a microprocessor (28). Slow movements in the vehicle are determined from the signals from the low pass filter (25), while fast movements in the vehicle are determined from the signal from the ~~band pass~~bandpass filter (27). Interference signals, such as mobile phone signals are determined and identified from the signal from the high pass filter (26) and the low pass filter (25). In the event of interference being caused by a mobile phone, a low frequency energy alarm threshold value (40) of the energy in the signal from the low pass filter (25), at which an alarm condition would be determined as having been detected, is increased to an intermediate threshold value (40''') which is above the ~~25~~ energy value of the low frequency component of the mobile phone interference, thereby preventing a false alarm due to the presence of mobile phone interference. However, the intermediate value (40''') of the low frequency energy alarm threshold is such as to permit detection for slow movements in the vehicle during the presence of the mobile phone interference.

Signed and Sealed this

Third Day of November, 2009

David J. Kappos
*Director of the United States Patent and Trademark Office*